United States Patent Office 3,029,950
Patented Apr. 17, 1962

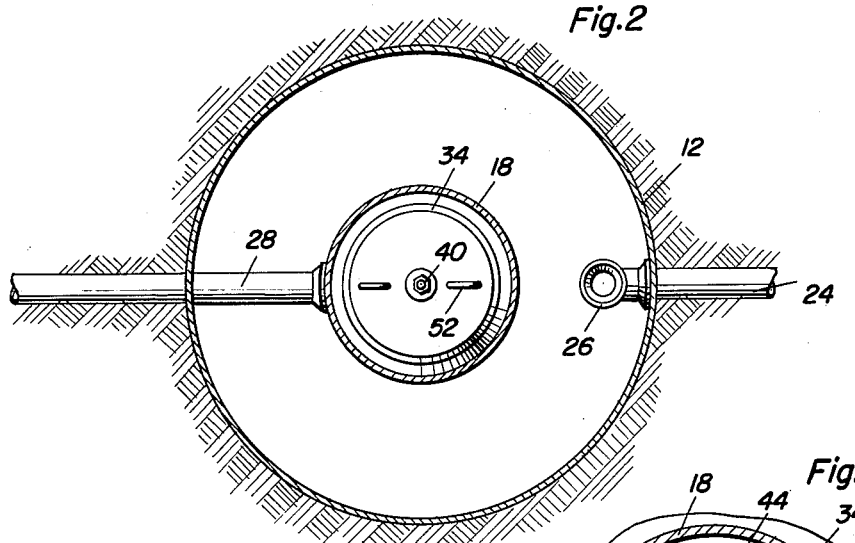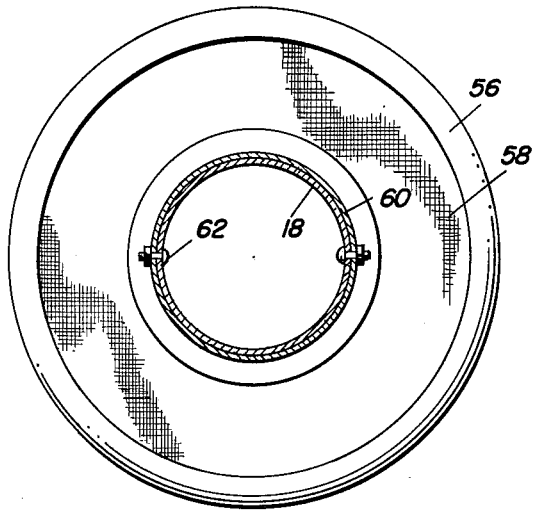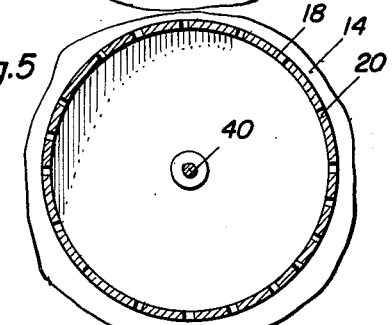

3,029,950
COMBINED SEPTIC TANK AND FILTER
Benjamin J. Frasca, 9621 Goodwood Blvd.,
Baton Rouge, La.
Filed Sept. 29, 1958, Ser. No. 764,139
6 Claims. (Cl. 210—256)

The present invention generally relates to a complete sewage treatment plant and effectively combines a septic tank and filter assembly which combines the function of the septic tank and provides chemical treatment of the affluent thereby effectively providing a secondary treatment for the sewage before it is discharged.

The primary object of the present invention is to provide a combined septic tank and filter which includes two concentric tanks with the outer tank being isolated from the inner tank except at the bottom where the two are communicated thereby providing an outer tank which is completely dark and which acts in the same manner as a conventional septic tank with the inner tank being ventilated and provided with a removable filter assembly which includes a chemical insert for secondary treatment of the affluent which enters the inner tank from the bottom of the outer tank thus providing a discharge fluid which is substantially free of bacteria.

Another object of the present invention is to provide a combined septic tank and filter which is extremely simple in construction, easy to install, constructed for ease of replacement of the filter assembly and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a transverse, plan sectional view taken substantially upon a plane passing along section line 2—2 of FIGURE 1;

FIGURE 3 is a transverse, sectional view taken substantially upon a plane passing along section line 3—3 of FIGURE 1;

FIGURE 4 is a transverse sectional view taken substantially upon a plane passing along section line 4—4 of FIGURE 1; and FIGURE 5 is a transverse, plan sectional view taken substantially upon a plane passing along section line 5—5 of FIGURE 1.

Figure 1:
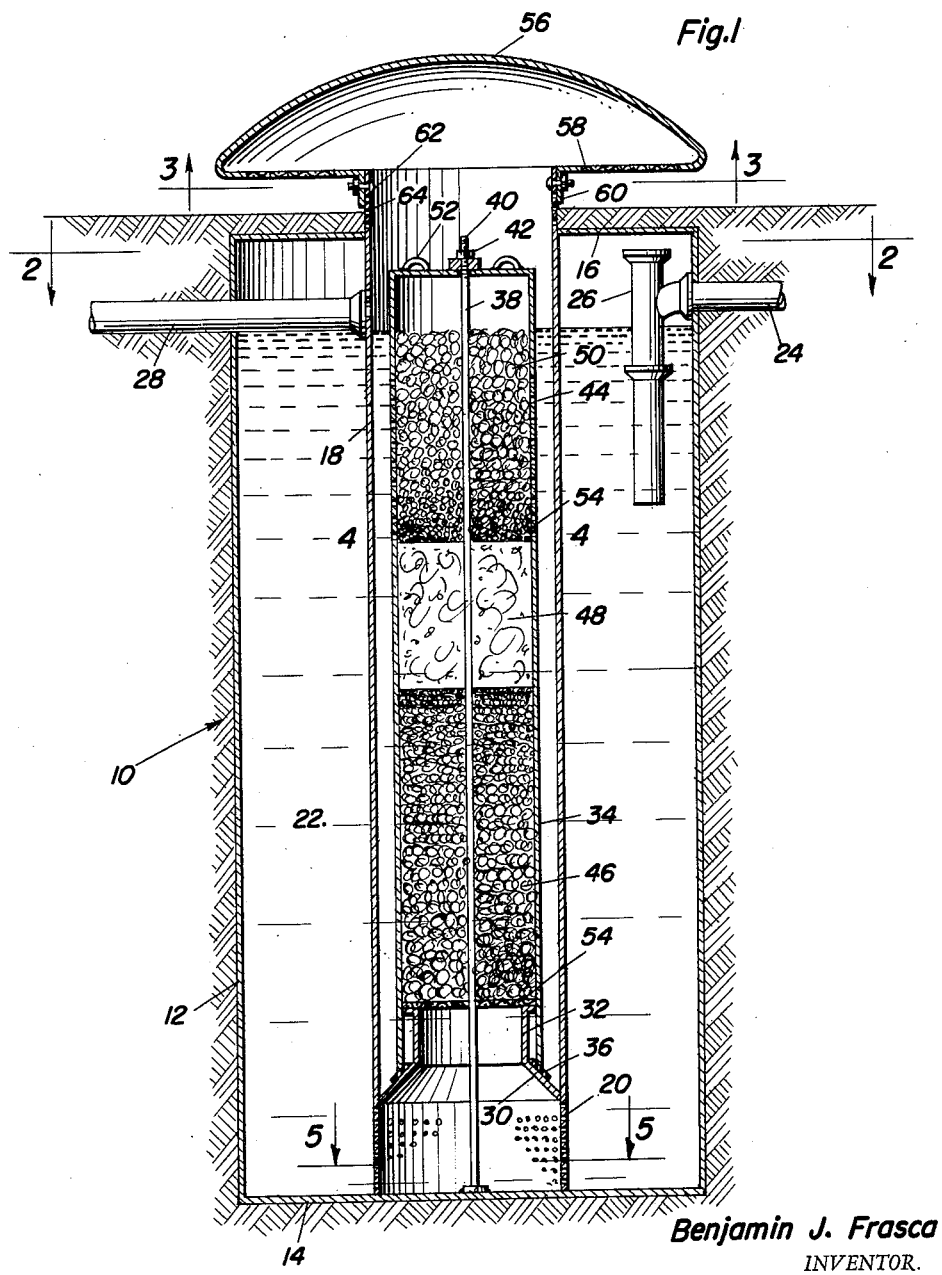
FIGURE 1 is a sectional view of the combined septic tank and filter of the present invention.

Referring now specifically to the drawings, the numeral 10 generally designates the combined septic tank and filter assembly of the present invention which includes an outer tank 12 which has a continuous bottom wall 14 and an upper wall 16 having an enlarged central aperture through which the inner tank or concentric wall, tube or cylinder 18 extends. The inner tank 18 is rigidly secured to the top 16 as by welding and is also rigidly secured to the bottom 14 as by welding with the lower end portion of the tank 18 being constructed with a multiplicity of apertures as designated by the numeral 20 thus communicating the bottom of the external tank with the bottom of the internal tank. The concentric arrangement of the tanks 12 and 18 provides an annular space 22 therebetween which actually forms a septic tank and the space 22 is provided with a soil inlet pipe 24 which extends through the tank 12 adjacent the top 16 and is provided with a vertical down pipe 26 arranged in the space 22. Thus, when the mixed solids and liquids come into the space 22, the solids will be disposed adjacent the top thereof and due to the bactericidal action occurring in the dark space 22, the solids will be broken down and will be discharged out through the bottom of the space 22 by virtue of the liquid affluent passing through the apertures 20 into the interior of the tank 18.

The inner tank 18 is provided with a discharge pipe or conduit 28 which communicates with the interior of the inner tank 18 and extends out through the outer tank 12 in sealed relation thereto. It is noted that the outlet pipe 28 is slightly below the inlet pipe 24 thus providing a fall between the inlet and outlet for ensuring flow of affluent from the inlet to the outlet. The outlet pipe 28 may be connected with any suitable drain field or drain bed for discharge of the affluent.

Rigidly secured to the interior surface of the tank 18 is an inwardly extending frusto-conical element or flange 30 located immediately above the apertures 20 in the inner tank 18. Extending upwardly from the frusto-conical element 30 is a cylindrical member or tube 32 which telescopes into the lower end of a filter unit, cartridge or container 34 which has the terminal end thereof extending downwardly into contact with the outer surface of the frusto-conical member 30 and seated against a seal 36 thereon. Welded to the bottom 14 of the outer tank 12 is an elongated rod 38 having a threaded upper end 40 for receiving a nut 42 whereby the filter cartridge 34 is retained tightly against the seal 36 thus providing a continuity of sealed relationship between the tank 18 and the filter cartridge 34. The peripheral wall of the filter cartridge 34 is imperforate from the lower end to a point adjacent the upper end with the upper end being perforated as designated by the numeral 44. Disposed in the lower portion of the filter cartridge 34 is rock or gravel 46 which are larger at the lower end and graded to a smaller size adjacent the center of the cartridge. Disposed above the gravel 46 is a chemical or purifying agent designated by the numeral 48 and above the chemical 48 is another layer of rock or aggregate 50 again having the smallest rock or gravel adjacent the center and the largest adjacent the upper end. The portion of the tank 34 above the chemical 48 is apertured, as stated, with apertures 44 thus assuring flow of affluent upwardly through the rock 46 and then through the chemical purifying agent 48 and then up through the rock bed 50 and out through the apertures 44 for discharge out of the outlet opening 28.

The upper end of the filter cartridge 34 is provided with a pair of loops 52 for receiving a lifting hook from a crane or the like so that the filter cartridge may be removed from the inner tank 18. Also, separation partitions 54 of foraminous material may be provided between the rock and the chemical so that the chemical insert may be easily replaced and the chemical insert may be received in a perforated container or bag such that the chemical insert may be replaced more easily. For providing ventilation to the interior tank 18, there is is provided a dome-shaped cover 56 having an inwardly extending lower end 58 of foraminous material for permitting air passage together with a downturned flange 60 having a plurality of apertures therein for receiving fastening bolts 62 which are received in one of a plurality of apertures 64 in the upper end of the inner tank 18 which extends above grade level thereby varying the position of the dome 56 so that the same will always be above grade level so that air may circulate into the interior tank 18 thus ventilating the interior tank 18 and further permitting easy access to the interior tank 18 inasmuch as the dome shaped cover 56 may be easily removed by removing the bolts 62. The dome shaped cover may be vertically adjusted so that the same is at a desired elevation above the ground surface for assuring ventilation and preventing flooding of the interior tank. If desired, the top 16 may be removable for permitting access into the interior of the space 22 for cleaning purposes. Also, the bottom partition 54 which is of foraminous material may be rigid with the cartridge wall 34 so that all of the cartridge and the rock and chemical will be removed when the cartridge 34 is removed. One example of the chemical purifying agent is bone char.

The foregoig is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combined septic tank and filter comprising an outer tank and an inner tank disposed generally in concentric spaced relation to each other thereby providing an annular space, an inlet at the upper end of the outer tank for discharging sewage into said space, an outlet at the upper end of the inner tank, the top of the outer tank connected to the inner tank whereby the space between the inner and outer tanks will be dark and isolated, means ventilating the inner tank, and means communicating the bottom of the inner tank with the bottom area of the outer tank whereby liquid affluent will pass from the outer tank into the inner tank only at the bottom thereof, and a removable cartridge comprising a vertical tube mounted centrally within the inner tank in spaced relation thereto for filtering the affluent as it moves vertically in the inner tank, said cartridge including a chemical purifying agent, said means ventilating the inner tank including a dome shaped cover for the inner tank and having a larger diameter than the inner tank, said inner tank extending above the top of the outer tank and above grade level, and a horizontal perforated member interconnecting the dome shaped cover and the upper end of the inner tank for ventilating the inner tank and preventing entrance of water into the inner tank.

2. A combined septic tank and filter comprising an outer tank and an inner tank disposed generally in concentric spaced relation to each other thereby providing an annular space, an inlet at the upper end of the outer tank for discharging sewage into said space, an outlet at the upper end of the inner tank, the top of the outer tank connected to the inner tank whereby the space between the inner and outer tanks will be dark and isolated, means ventilating the inner tank, and means communicating the bottom of the inner tank with the bottom area of the outer tank whereby liquid affluent will pass from the outer tank into the inner tank only at the bottom thereof, and a removable cartridge comprising a vertical tube mounted centrally within the inner tank in spaced relation thereto for filtering the affluent as it moves vertically in the inner tank, said cartridge including a chemical purifying agent, said means communicating the inner and outer tanks including a perforated section in the lower end of the inner tank, said inner tank including an inwardly extending funnel shaped adapter adjacent the lower end thereof and disposed above the perforated section, said cartridge including a peripheral wall sealingly engaging the adapter with the wall concentrically spaced from the inner tank, and means extending vertically through the cartridge for holding the cartridge down onto the adapter for sealing the same thereto.

3. The combination of claim 2 wherein said chemical cartridge includes a layer of rock at each end thereof and a centrally disposed layer of chemical purifying agent such as bone char for providing secondary treatment to the affluent before it passes out of the discharge outlet in the inner tank, said cartridge having an imperforate wall engaging the funnel-shaped adapter and extending above the layer of purifying agent, the portion of the cartridge above the purifying agent having a perforate wall portion for discharge of purified effluent from the cartridge into the inner tank.

4. A septic tank and filter comprising an outer tank including a top and a bottom, said outer tank having an inlet in its upper portion, an inner tank comprising a vertical tube mounted in the outer tank in spaced relation to the vertical walls thereof and resting on said bottom, said tube being open at its ends and having its upper end portion projecting upwardly through and beyond said top and communicating with the atmosphere, said tube including a perforated lower portion communicating with the outer tank for receiving affluent therefrom, said tube having an outlet in its upper portion, a filter unit for the affluent in the inner tank, said filter unit including a vertical tube removably mounted in the first named tube in spaced relation thereto and including a foraminous upper portion, said filter tube comprising a closed upper end and an open lower end communicating with said first named tube for reeciving the affluent therefrom, a filtering medium in the filter tube, means for supporting the filter unit in the first named tube in vertically spaced relation to the outer tank bottom, and means for releasably securing the filter unit in position in said first named tube, the first-named means including a substantially frusto-conical flange mounted circumferentially in the first-named tube above but adjacent said perforated lower end portion thereof, said flange seatingly receiving thereon the open lower end of the filter tube, and an upstanding tube on the flange engaged in the filter tube.

5. A spectic tank and filter comprising an outer tank including a top and a bottom, said outer tank having an inlet in its upper portion, an inner tank comprising a vertical tube mounted in the outer tank in spaced relation to the vertical walls thereof and resting on said bottom, said tube being open at its ends and having its upper end portion projecting upwardly through and beyond said top and communicating with the atmosphere, said tube including a perforated lower portion communicating with the outer tank for receiving affluent therefrom, said tube having an outlet in its upper portion, a filter unit for the affluent in the inner tank, said filter unit including a vertical tube removably mounted in the first named tube in spaced relation thereto and including a foraminous upper portion, said filter tube comprising a closed upper end and an open lower end communicating with said first named tube for receiving the affluent therefrom, a filtering medium in the filter tube, means for supporting the filter unit in the first named tube in vertically spaced relation to the outer tank bottom, and means for releasably securing he filter unit in position in said first named tube, the second-named means including a vertical rod having its lower end affixed to the outer tank bottom, said rod extending centrally through the filter tube and including a threaded upper end portion projecting through the closed upper end thereof, and a retaining nut for the filter tube threaded on said rod.

6. A septic tank and filter comprising an outer tank including a top and a bottom, said outer tank having an inlet in its upper portion, an inner tank comprising a vertical tube mounted in the outer tank in spaced relation to the vertical walls thereof and resting on said bottom, said tube being open at its ends and having its upper end portion projecting upwardly through and beyond said top and communicating with the atmosphere, said tube including a perforated lower portion communicating with the outer tank for receiving affluent therefrom, said tube having an outlet in its upper portion, a filter unit for the affluent in the inner tank, said filter unit including a vertical tube removably mounted in the first named tube in spaced relation thereto and including a formainous upper portion, said filter tube comprising a closed upper end and a open lower end communicating with said first named tube for receiving the affluent therefrom, a filtering medium in the filter tube, means for supporting the filter unit in the first named tube in vertically spaced relation to the outer tank bottom, and means for releasably securing the filter unit in position in said first named tube, the first-named means including a substantially frusto-conical flange mounted circumferentially in the first-named tube above but adjacent said perforated lower end portion thereof, said flange seatingly receiving thereon the open lower end of the filter tube, and an upstanding tube on the flange engaged in the filter tube, the second-named means including a vertical rod having its lower end affixed to the outer tank bottom, said rod extending centrally through the filter tube and including a threaded upper end portion projecing through the closed upper end thereof, and a retaining nut for the filter tube threaded on said rod.

References Cited in the file of this patent

UNITED STATES PATENTS

| | | |
|---|---|---|
| 800,113 | Kassian | Sept. 19, 1905 |
| 834,776 | Vance | Oct. 30, 1906 |
| 1,002,089 | Sofleiss | Aug. 29, 1911 |
| 1,032,700 | Pickett | July 16, 1912 |
| 1,266,132 | Lassen et al. | May 14, 1918 |
| 1,381,615 | Buby | June 14, 1921 |
| 1,458,796 | Baumgardner | June 12, 1923 |
| 1,817,572 | Linley et al. | Aug. 4, 1931 |
| 2,841,286 | Abos et al. | July 1, 1958 |